United States Patent
Kamphuis et al.

(10) Patent No.: US 6,741,462 B2
(45) Date of Patent: May 25, 2004

(54) COMPACT, LOW FRICTION EJECTION MECHANISM FOR NOTEBOOK DOCKING STATION

(75) Inventors: Kevin L. Kamphuis, Round Rock, TX (US); Cassius J. Mullen, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/196,641

(22) Filed: Jul. 16, 2002

(65) Prior Publication Data

US 2004/0012922 A1 Jan. 22, 2004

(51) Int. Cl.[7] .................................................. G06F 1/16
(52) U.S. Cl. ....................................... 361/686; 361/683
(58) Field of Search ................................... 361/679–686

(56) References Cited

U.S. PATENT DOCUMENTS

| | | | |
|---|---|---|---|
| 5,969,939 A | | 10/1999 | Moss et al. |
| 5,997,323 A | * | 12/1999 | Youn .......................... 439/159 |
| 6,011,687 A | | 1/2000 | Gluskoter et al. |
| 6,023,411 A | | 2/2000 | Howell et al. |
| 6,049,454 A | | 4/2000 | Howell et al. |
| 6,061,234 A | | 5/2000 | Broder et al. |
| 6,069,790 A | * | 5/2000 | Howell et al. .............. 361/686 |
| 6,188,572 B1 | | 2/2001 | Liao et al. |
| 6,222,728 B1 | | 4/2001 | Jaggers et al. |
| 6,259,601 B1 | | 7/2001 | Jaggers et al. |

* cited by examiner

Primary Examiner—Darren Schuberg
Assistant Examiner—Yean-Hsi Chang
(74) Attorney, Agent, or Firm—Haynes and Boone, LLP

(57) ABSTRACT

A docking station ejection apparatus includes a housing having a movably mounted actuator. A first member is mounted in the housing and movable from a first position to a second position in response to movement of the actuator. An ejector is moved to an eject position in response to movement by the first member to the second position. A second member is movably mounted in the housing for movement between the first and second positions in response to movement of the first member to the second position. A catch member is mounted in the housing and is movable between a catch position and a release position. The catch member is moved in response to movement by the second member to the second position. A first resilient member urges the first and second members to the first position, and a second resilient member urges the catch member to the catch position.

19 Claims, 8 Drawing Sheets

COMPACT, LOW FRICTION EJECTION MECHANISM FOR NOTEBOOK DOCKING STATION

BACKGROUND

The disclosures herein relate generally to information handling systems and more particularly to an ejection device for docking stations used in such systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Desktop computers include a monitor which is usually supported on a monitor stand. The stand typically is supported by legs and a space is provided under the stand for a docking station and a notebook computer. Typically, the docking connector is positioned at the back of the notebook.

One manufacturer currently provides an advanced port replicator (APR) and dock that uses a bottom docking arrangement rather than docking at the back of the notebook. This system uses an ejection mechanism that involves many sliding components which require a special grease to operate properly.

In a bottom docking arrangement, the portion of the full dock and the APR that fits beneath the notebook must be of minimal height to keep the notebook as near to horizontal as possible and to make the system work well within the limited height beneath the monitor stand.

Another consideration for the eject mechanism is the force the user must apply to actuate the mechanism. This force should be minimal. Therefore, the mechanism needs to take full advantage of the available space to maximize leverage. The friction in the mechanism must be minimized so that leverage that is generated isn't lost as a result of overcoming friction.

Therefore, what is needed is an eject mechanism which operates satisfactorily in a compact environment.

SUMMARY

One embodiment, accordingly, provides an eject mechanism which is sufficiently compact. To this end, a docking station ejection apparatus includes a housing and an actuator movably mounted on the housing. A first member is mounted in the housing for movement between a first position and a second position in response to movement of the actuator. An ejector member is movable to an eject position in response to movement by the first member to the second position. A second member is mounted in the housing for movement between the first position and the second position in response to movement of the first member to the second position. A catch member is mounted in the housing and is movable between a catch position and a release position. A first resilient member urges the first and second members to the first position, and a second resilient member urges the catch member to the catch position.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
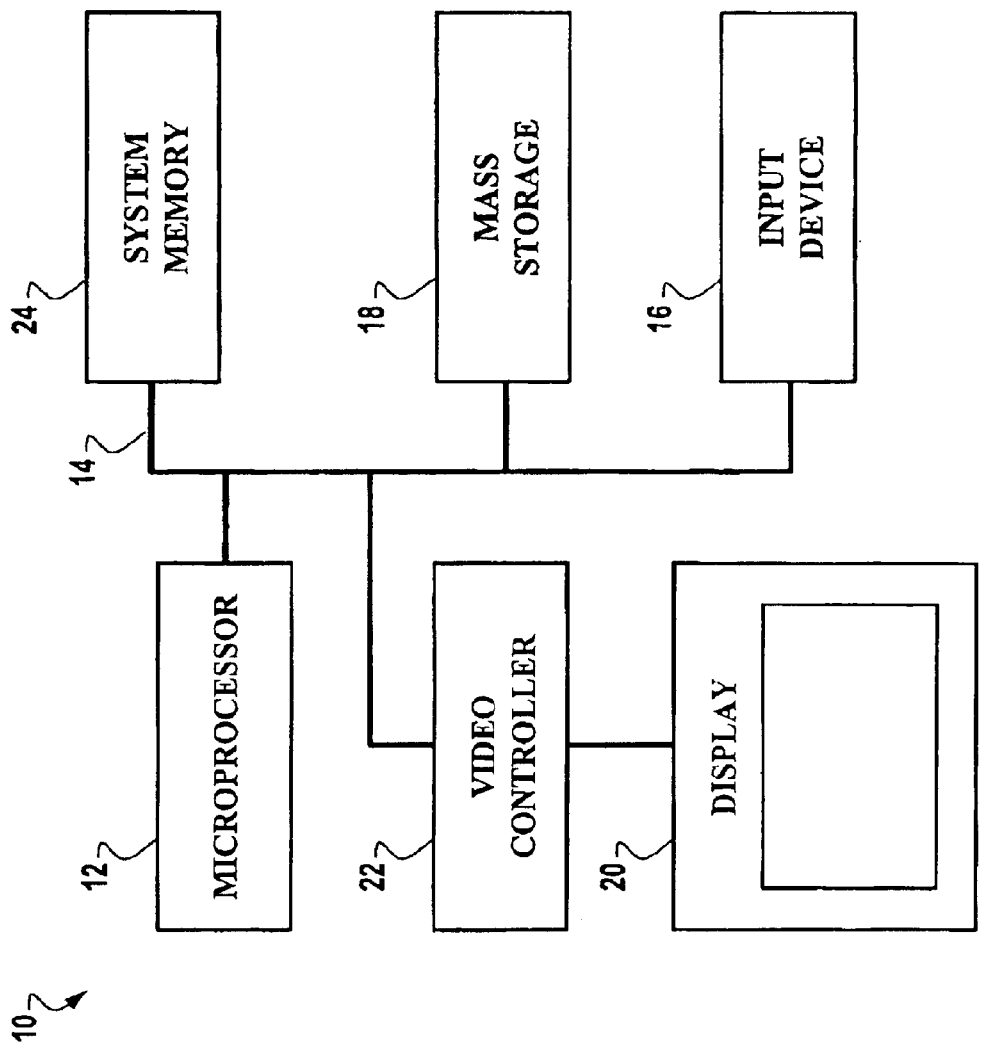
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
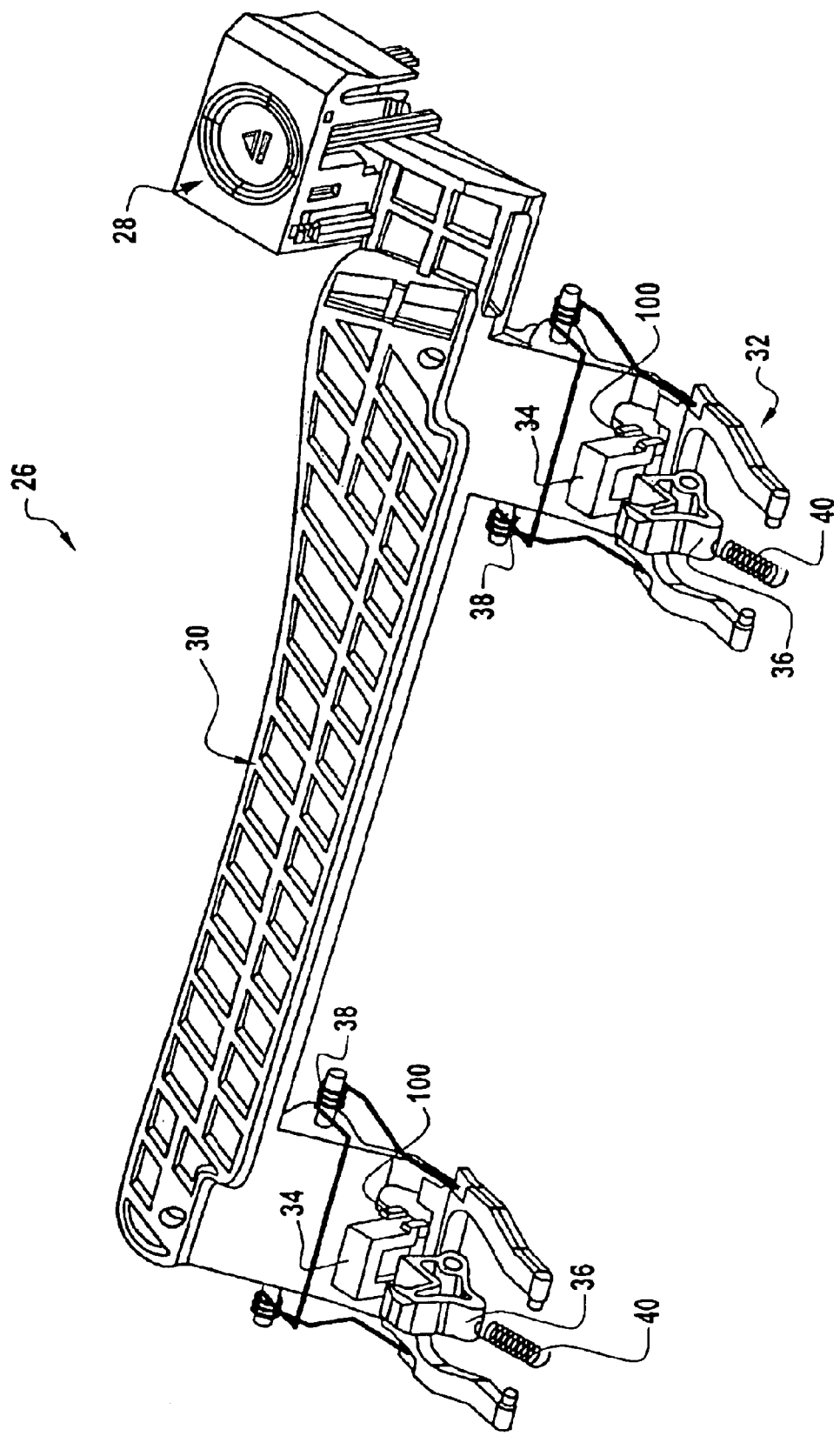
FIG. 2 is a perspective view illustrating an embodiment of a docking station ejection apparatus.

A docking station ejection apparatus 26, FIG. 2, includes an actuator member 28, a first member 30, a pair of second members 32, a pair of ejector members 34, a pair of catch members 36, a pair of first resilient (preferably torsion) members 38, and a pair of second resilient (preferably tension) members 40 which extend from catch members 36 for attachment to a housing 42.

Figure 3:
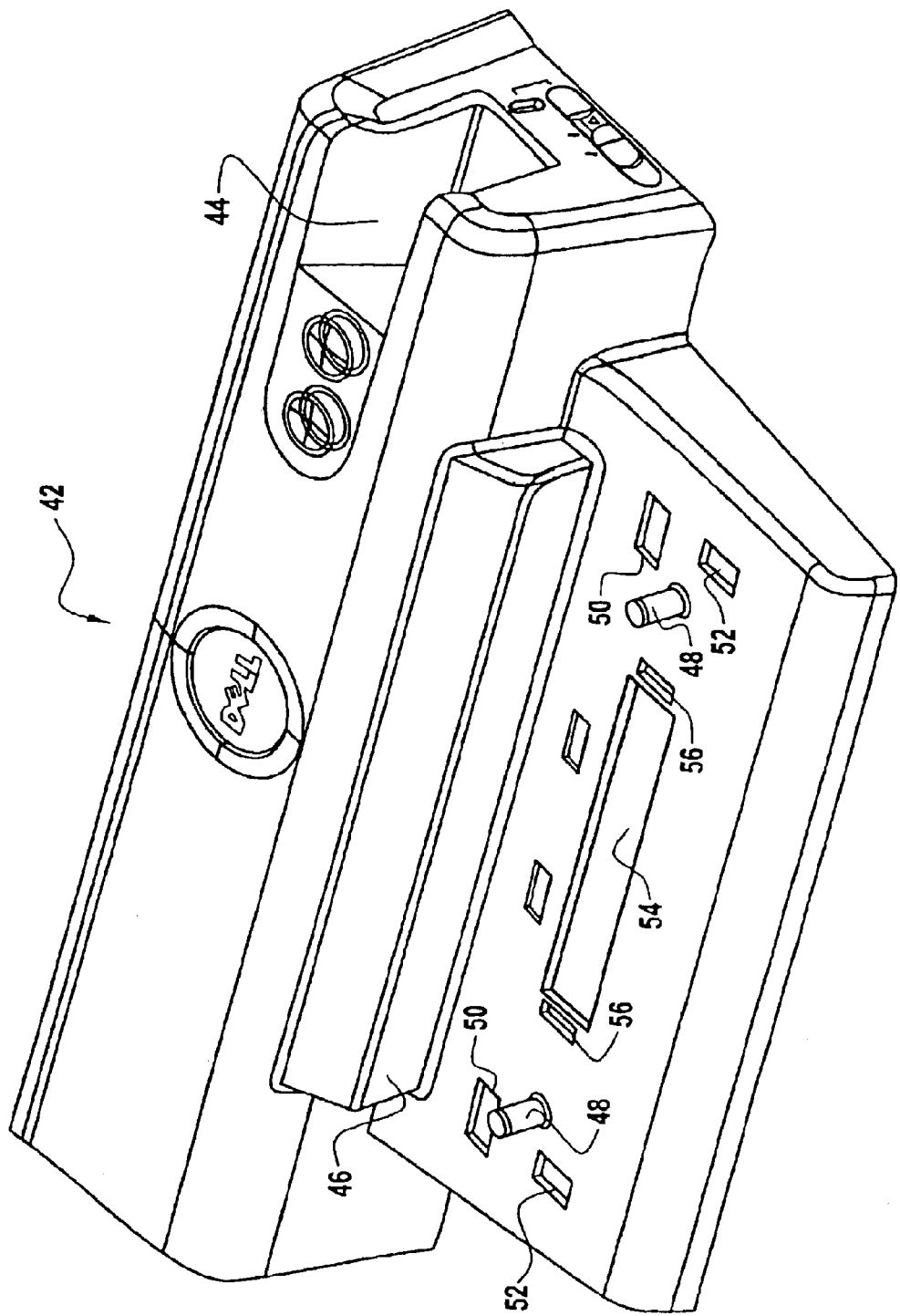
FIG. 3 is a perspective view illustrating an embodiment of a housing for the apparatus of FIG. 2.

The docking station housing 42, FIG. 3, includes an actuator channel 44, a surface guide 46, a pair of locators 48, a pair of ejector openings 50, a pair of catch openings 52, a docking plug opening 54 for receiving a connector 55 (FIG. 5), and a pair of apertures 56.

Figure 4:
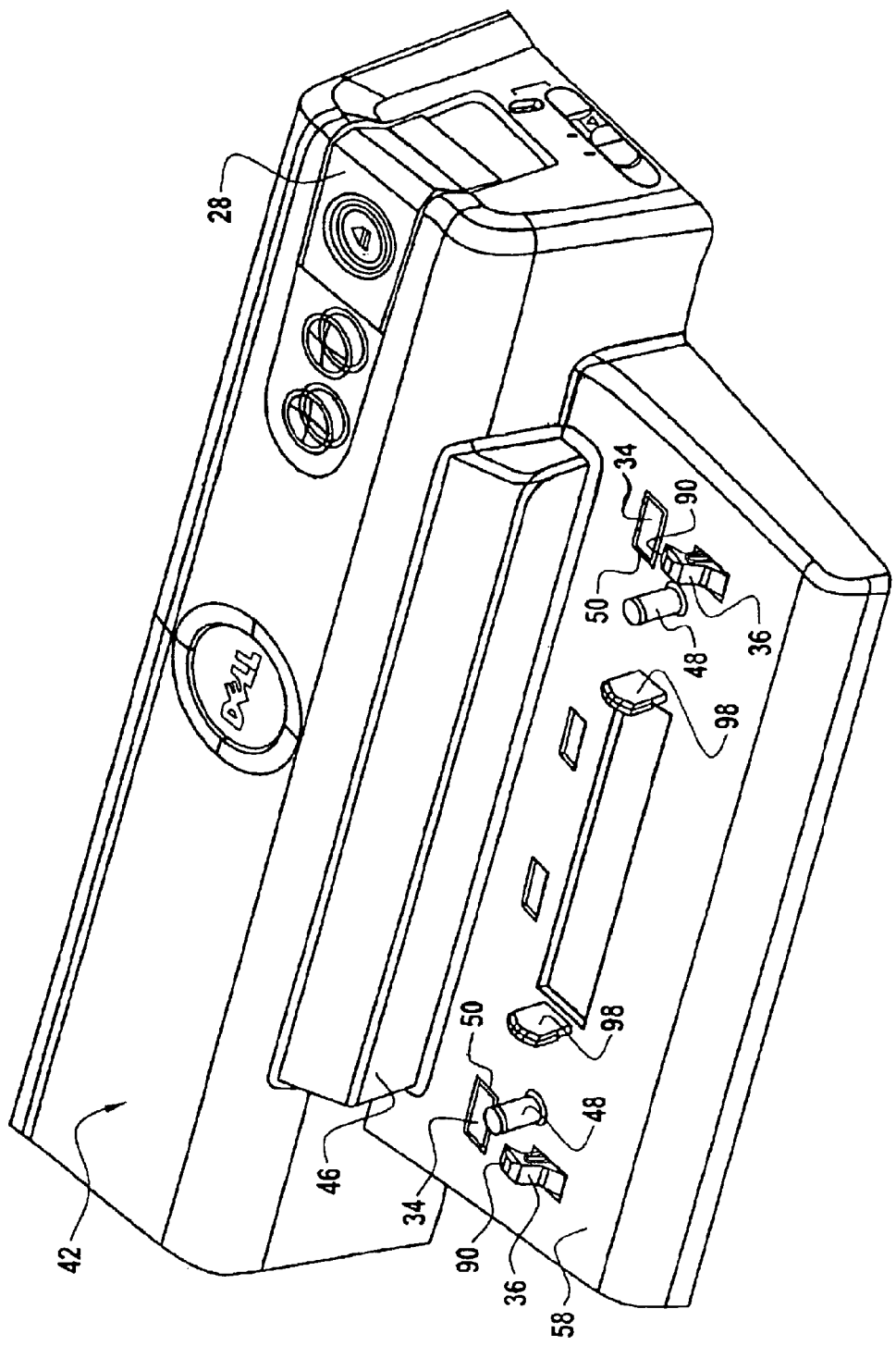
FIGS. 4 and 5 are further views of the housing of FIG. 3.
Figure 5:
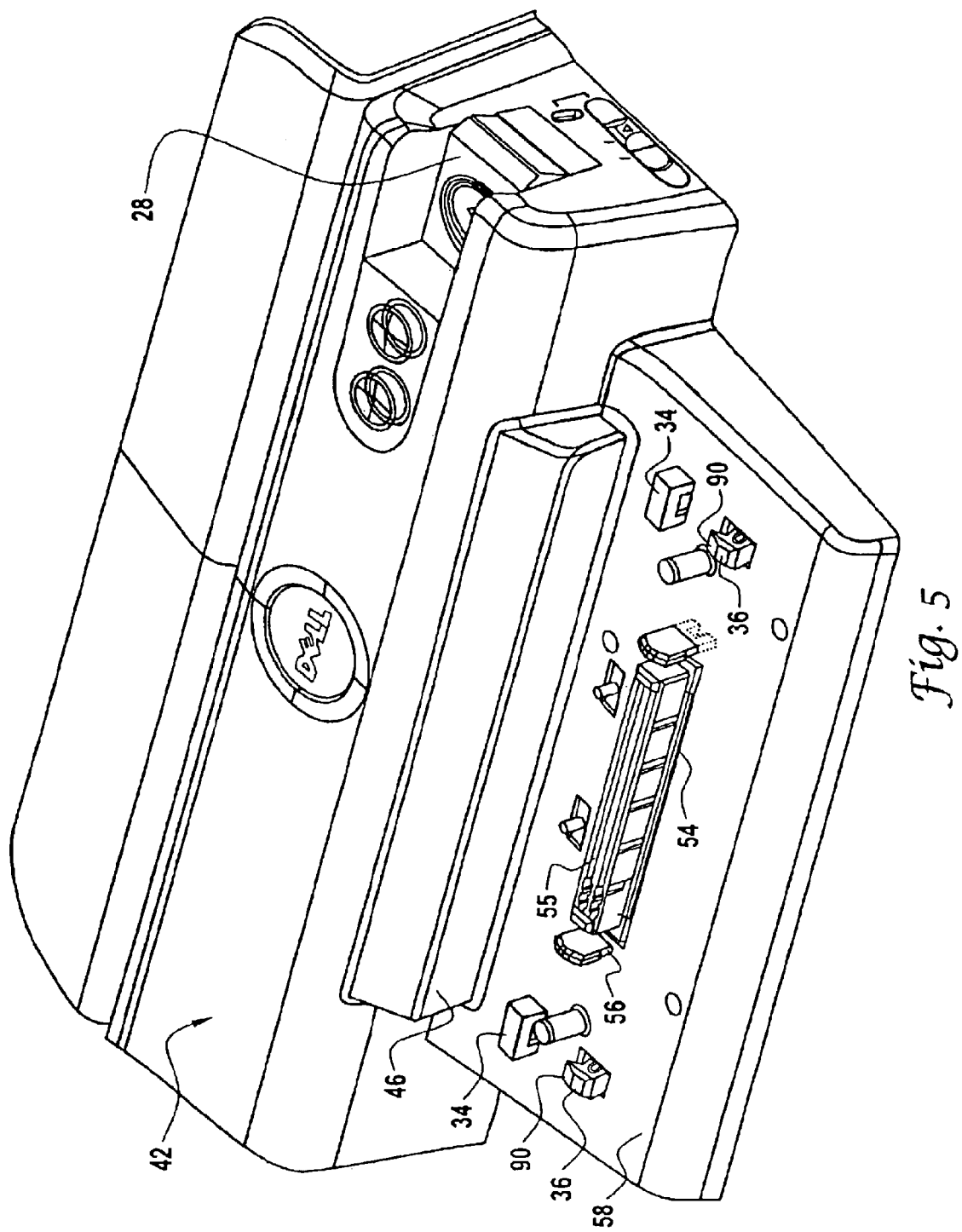

In FIG. 4, actuator member 28 is in a rest position. Ejector members 34 are flush with a surface 58 of docking station housing 42 in ejector openings 50. Catch members 36 are illustrated in a catch position. In FIG. 5, actuator member 28 is in an eject position. Ejector members 34 are extended from surface 58 of docking station housing 42. Catch members 36 are illustrated in a release position.

Figure 6:
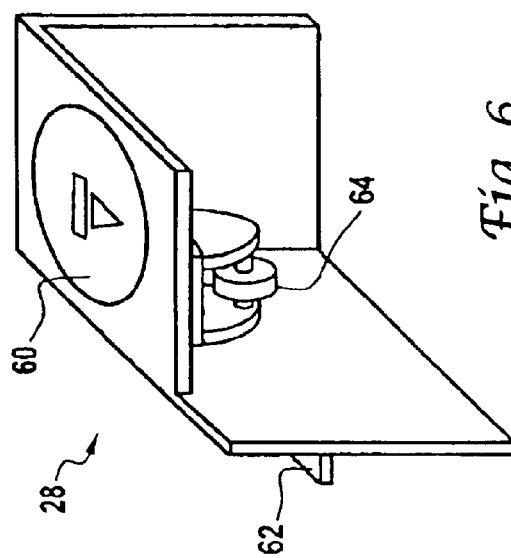
FIGS. 6–9 are views illustrating components of the apparatus of FIG. 2.
Figure 7:
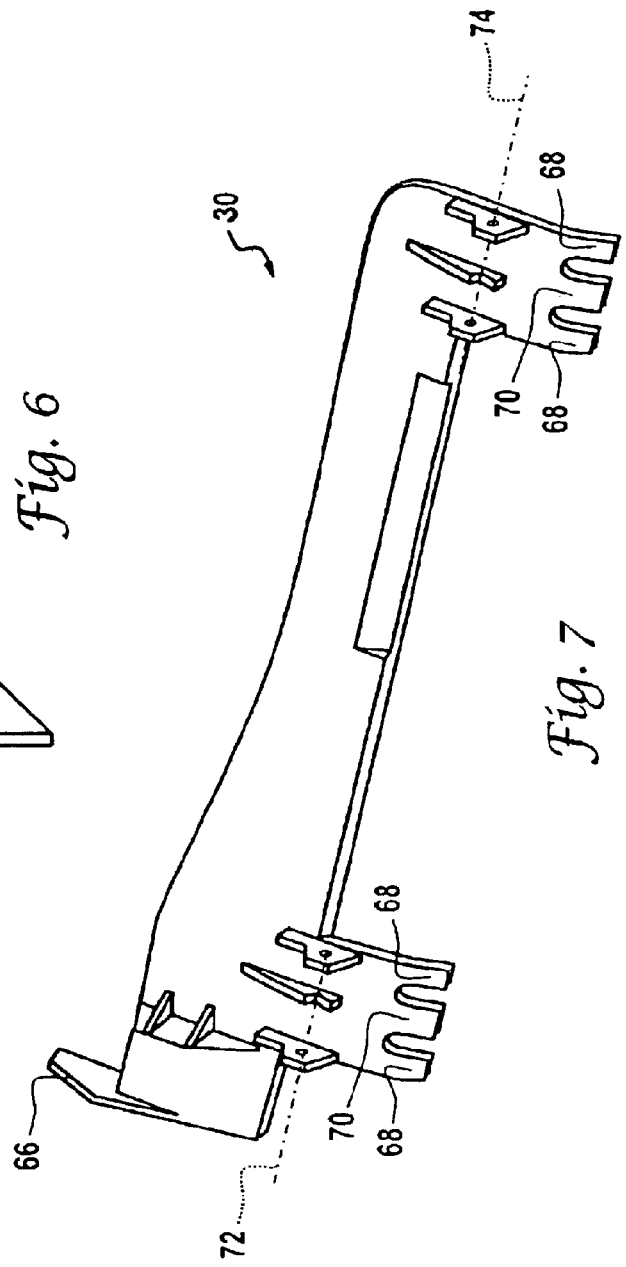

Actuator member 28, FIG. 6, includes a pressure surface 60, a housing stop 62, and a rolling contact surface 64. Actuator member 28 seats in actuator channel 44, FIG. 3. First member 30, FIG. 7, includes an actuator contact surface 66, a plurality of second member contact surfaces 68, a lifter contact surface 70, a first pivot axis 72, and a second pivot axis 74.

Figure 9:
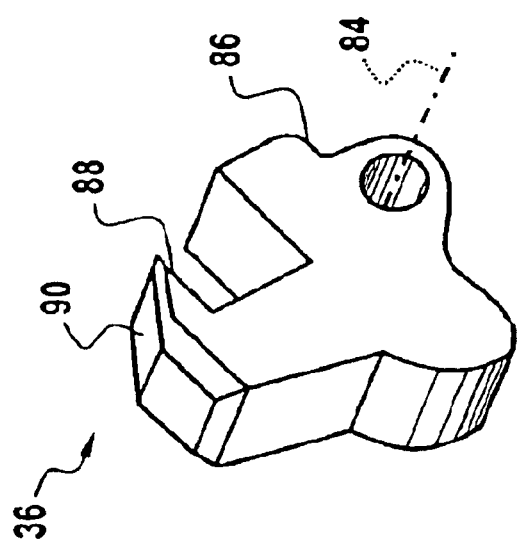
Figure 8:
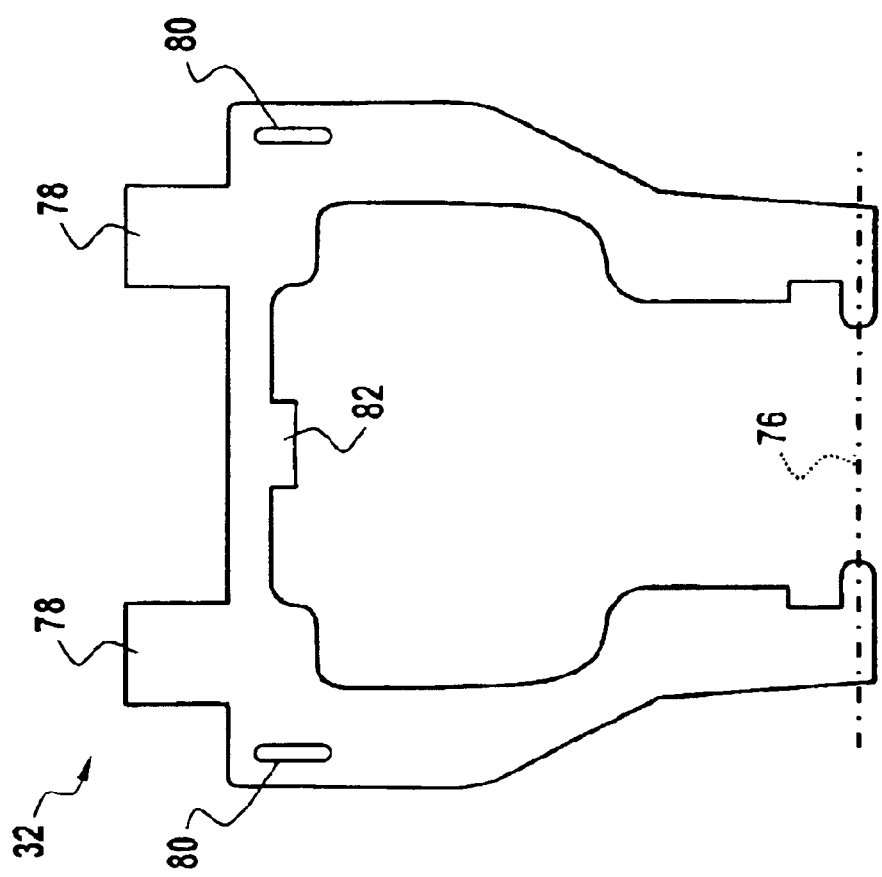

Each second member 32, FIG. 8, includes a second member pivot axis 76, a plurality first member contact surfaces 78, a pair of first resilient member holes 80, and a catch member cam 82. Each catch member 36, FIG. 9, includes a catch member pivot axis 84, a second member contact surface 86, a catch surface 88, and a beveled surface 90. Rolling contact surface 64 of actuator member 28 contacts actuator contact surface 66 on first member 30. Lifter contact surface 70 of first member 30 contacts ejector member 34. Contact surfaces 68 on first member 30 make contact with surfaces 78 on second member 32. Catch member cam 82 on second member 32 contacts surface 86 on catch member 36. First resilient member 38 interconnects first member 30 and second member 32 at first resilient member holes 80.

Figure 10:
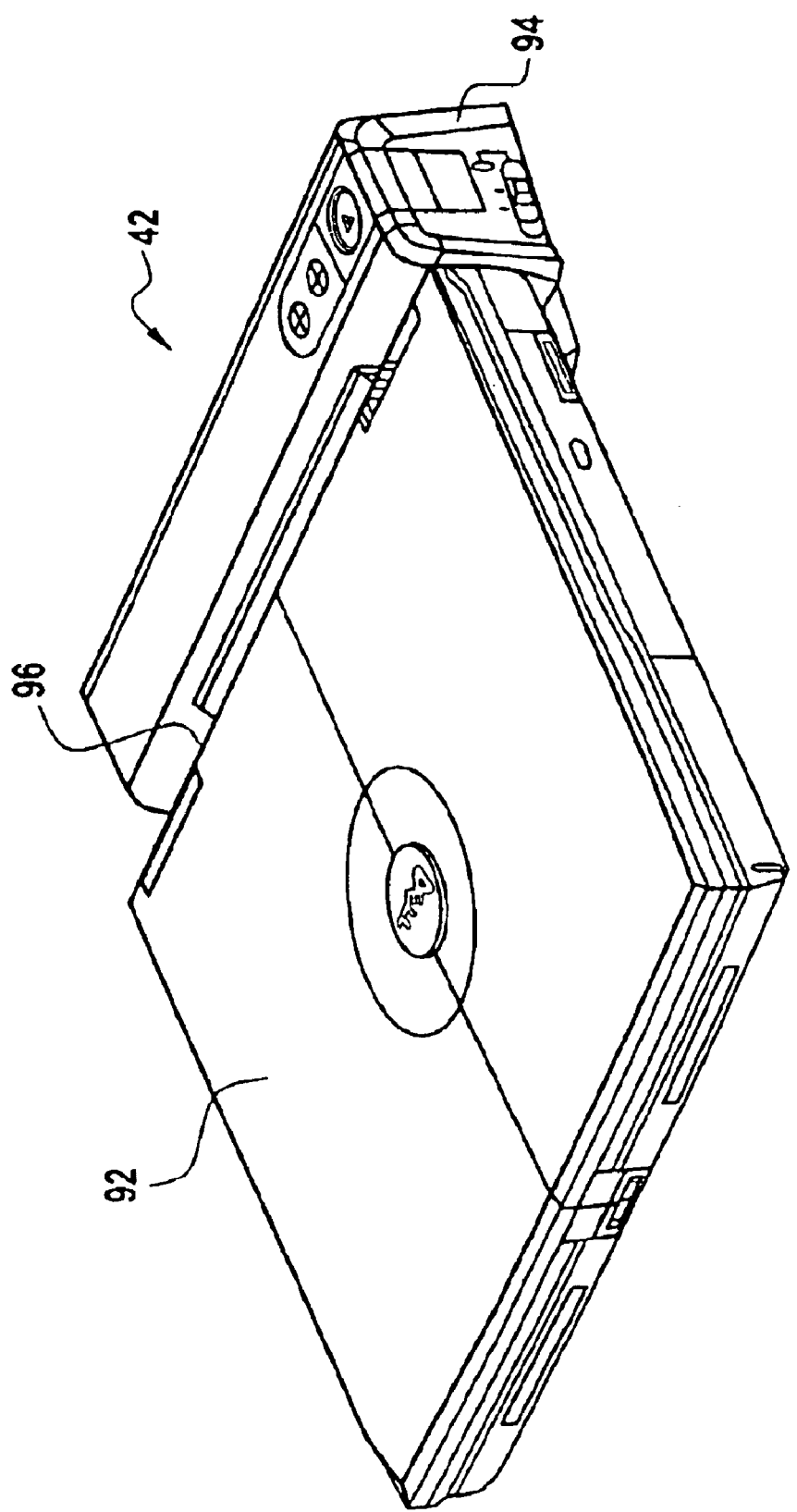
FIG. 10 is a perspective view illustrating an embodiment of a computer system docked at the docking station.

In operation, a portable computer 92, FIG. 10 is docked in a docking station 94. Portable computer 92 is docked by placing portable computer back surface 96 against surface guide 46, FIGS. 4 and 5, and lining up portable computer 92 by mating locaters 48 with guide holes (not shown) in portable computer 92. Portable computer 92 is then lowered onto docking station 94. As portable computer 92 is lowered, a pair of resiliently mounted opening members 98 which extend through apertures 56, urge open a door (not shown) covering a docking connector on portable computer 92. Catch holes on the bottom of portable computer 92 urge catch members 36 into a release position by sliding along beveled surface 90. As portable computer 92 comes into contact with surface 58 of docking station housing 42, catch members 36 lock into the catch holes on the bottom of portable computer 92 and revert to the catch position. Portable computer 92 is now docked in docking station.

Docking station ejection apparatus, FIG. 2 (see also FIGS. 6, 7, 8, and 9), is actuated by applying force to pressure surface 60 of actuator member 28. That force is transferred from actuator member 28 to first member 30 through the contact of rolling contact surface 64 and actuator contact surface 66. Rolling contact surface 64 provides a low friction contact point between actuator member 28 and first member 30 that helps reduce the force necessary to actuate docking station ejection apparatus 26.

As force is applied to actuator member 28, first member 30 pivots through first pivot axis 72 and simultaneously through second pivot axis 74. As first member 30 pivots, lifter contact surfaces 70 of first member 30 push ejector members 34 linearly through ejector openings 50. Ejector members 34 extend from the surface 58 of docking station housing 42 and apply an upward force on portable computer 92. Simultaneously, second member contact surface 68 of first member 30 push first member contact surfaces 78 of second member 32, moving second member 32 pivotally through second member pivot axis 76. As second member 32 pivots, catch member cam 82 on second member 32 contacts surface 86 on catch member 36, moving catch member 36 pivotally through catch member pivot axis 84. Catch member 36 moves to the release position, and portable computer 92 is released from docking station 94 as ejector members 34 push portable computer 92 off docking station 94. Portable computer 92 is now undocked.

The present ejection mechanism offers several advantages. The mechanism centers around an eject plate that acts as a lever to lift two lifters which in turn push the notebook off of the docking connector. By hinging the eject plate, friction is minimized. Other components in the mechanism are also designed with minimal friction in mind. The eject button is made from a special plastic with low friction. A roller transmits the force from the button to the eject plate thereby minimizing friction in that interface. The lifters are also made from a low friction plastic.

The eject mechanism also performs an additional function. It disengages the hooks in order to release the notebook before it is ejected. Each hook is disengaged by a rocker that pushes the hook open by means of a cam surface. The rocker is actuated by the eject plate. Using the rocker in combination with the eject plate results in very little space required below the notebook. Similar to other components, the rockers are made from a suitable plastic material with low friction.

The present device requires no special lubricants. Lubricants are undesirable in manufacturing due to inconsistent application and the possibility of getting lubricant where it is not wanted such as on cosmetic surfaces and electronic components. The present device operates with lower friction. This device minimizes the sliding interfaces that contribute to high friction. It maximizes the use of pivoting components with low frictional losses. Therefore, more of the input force is utilized for the output force. The present device provides more leverage. The eject plate allows for greater leverage. Therefore, the user does not have to push hard to eject the notebook. Also, the notebook seats at a lower notebook angle and therefore does not require as much space below the notebook.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A docking station ejection apparatus comprising:
   a housing;
   an actuator movably mounted on the housing;
   a first member mounted in the housing for movement between a first position and a second position in response to movement of the actuator;
   a roller member providing contact between the actuator and the first member;
   an ejector member movable to an eject position in response to movement by the first member to the second position;

a second member mounted in the housing for movement between the first position and the second position in response to movement of the first member to the second position;

a catch member mounted in the housing and movable between a catch position and a release position, the catch member being moved in response to movement by the second member to the second position;

a first resilient member urging the first and second members to the first position; and a second resilient member urging the catch member to the catch position.

2. The apparatus of claim 1, wherein the actuator is slidably mounted in the housing.

3. The apparatus of claim 1, further comprising a locator member on the housing.

4. The apparatus of claim 1, further comprising a guide surface located on the housing.

5. The apparatus of claim 1, wherein the catch member includes a beveled surface.

6. The apparatus of claim 1, wherein the housing includes a docking connector opening for receiving a docking connector.

7. The apparatus of claim 1, wherein the first resilient member includes a torsion spring.

8. The apparatus of claim 1, wherein the second resilient member includes a tension spring.

9. An information handling system comprising:

a portable computer chassis;

a microprocessor mounted in the chassis;

a storage coupled to the microprocessor;

a portable computer docking station coupled to the chassis;

a housing on the docking station;

an actuator movably mounted on the housing;

a first member mounted in the housing for movement between a first position and a second position in response to movement of the actuator;

a roller member providing contact between the actuator and the first member;

an ejector member movable to an eject position in response to movement by the first member to the second position;

a second member mounted in the housing for movement between the first position and the second position in response to movement of the first member to the second position;

a catch member mounted in the housing and movable between a catch position and a release position, the catch member being moved in response to movement by the second member to the second position;

a first resilient member urging the first and second members to the first position; and a second resilient member urging the catch member to the catch position.

10. The information handling system of claim 9, wherein the actuator is slidably mounted in the housing.

11. The information handling system of claim 9, further comprising an opening member mounted on the housing.

12. The information handling system of claim 9, further comprising a locator member on the housing.

13. The information handling system of claim 9, further comprising a guide surface on the housing.

14. The information handling system of claim 9, wherein the first member and the second member are pivotably mounted in the housing.

15. The information handling system of claim 9, wherein the catch member includes a beveled surface.

16. The information handling system of claim 9, wherein the first resilient member includes a torsion spring.

17. The information handling system of claim 9, wherein the second resilient member includes a tension spring.

18. A method for operating a docking station ejection apparatus comprising:

providing a housing;

movably mounting an actuator on the housing;

pivotably mounting a first member in the housing;

providing a roller member for contact between the actuator and the first member;

pivoting the first member from a first position to a second position in response to movement of the actuator;

linearly moving an ejector member to an eject position in response to movement by the first member to the second position;

pivotably mounting a second member in the housing;

pivoting the second member from the first position to the second position in response to movement of the first member to the second position;

pivotably mounting a catch member in the housing;

pivoting the catch member between a catch position and a release position in response to movement by the second member to the second position;

providing a first resilient member;

urging the first and second members to the first position with the first resilient member;

providing a second resilient member; and urging the catch member to the catch position with the second resilient member.

19. An information handling system comprising:

a chassis;

a microprocessor mounted in the chassis;

a storage coupled to the microprocessor;

a docking station including a housing;

an actuator movably mounted on the housing;

a first member mounted in the housing for movement between a first position and a second position in response to rolling contact with the actuator;

an ejector member movable to an eject position in response to movement by the first member to the second position;

a second member mounted in the housing for movement between the first position and the second position in response to movement of the first member to the second position;

a catch member mounted in the housing and movable between a catch position and a release position, the catch member being moved in response to movement by the second member to the second position;

a first resilient member urging the first and second members to the first position; and a second resilient member urging the catch member to the catch position.

* * * * *